(12) United States Patent
Reiser

(10) Patent No.: US 7,532,402 B2
(45) Date of Patent: May 12, 2009

(54) IMAGING DEVICE FOR IMAGING A LONG OBJECT

(75) Inventor: Georg Reiser, Munich (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 692 days.

(21) Appl. No.: 10/490,783

(22) PCT Filed: Sep. 18, 2002

(86) PCT No.: PCT/EP02/10449

§ 371 (c)(1),
(2), (4) Date: Mar. 24, 2004

(87) PCT Pub. No.: WO03/029848

PCT Pub. Date: Apr. 10, 2003

(65) Prior Publication Data

US 2004/0239998 A1    Dec. 2, 2004

(30) Foreign Application Priority Data

Sep. 27, 2001    (EP)    .................................. 01123134

(51) Int. Cl.
*G02B 27/10*    (2006.01)
(52) U.S. Cl. ........................ 359/619; 359/710
(58) Field of Classification Search ......... 359/652–654, 359/806, 619–629, 710
See application file for complete search history.

(56) References Cited

U.S. PATENT DOCUMENTS 3,650,598 A *    3/1972    Kitano et al. ............... 385/124
4,025,157 A       5/1977    Martin
4,852,982 A *    8/1989    Yamamoto et al. .......... 359/652
5,259,057 A *    11/1993   Cook .......................... 385/120
5,453,813 A *    9/1995    Arnold et al. ................. 355/41
5,568,312 A *    10/1996   Horton ........................ 359/435
5,619,488 A       4/1997    Ota et al.
5,796,525 A       8/1998    Dempewolf et al.
6,088,164 A       7/2000    Fukasawa
6,642,535 B2    11/2003    Gebele et al.
2001/0015855 A1*    8/2001    Toyama ..................... 359/652
2002/0008212 A1*    1/2002    Arakawa et al. ......... 250/492.1

FOREIGN PATENT DOCUMENTS

DE    199 62 775 C 1    3/2001
JP    02-260759 A       10/1990
JP    05-075701 U       10/1993

OTHER PUBLICATIONS

English Translation of Japanese Patent No. JP 05-075701 U, published Oct. 15, 1993.

* cited by examiner

*Primary Examiner*—Ricky Mack
*Assistant Examiner*—James R Greece
(74) *Attorney, Agent, or Firm*—Houston Eliseeva LLP

(57) ABSTRACT

The invention relates to an imaging device for imaging a long object. The imaging device includes at least one vertical lens device which concentrates light from the long object in a vertical direction, and a plurality of lens elements which are arranged in the form of a matrix in at least one lens line behind the vertical lens device, the lens elements respectively concentrating light from the long object in a horizontal direction. In order to achieve optimum light intensity in a cost-effective manner, each lens element comprises at least one horizontal collecting layer which is transparent to the light from the long object and comprises a refractive index having a gradient in the horizontal direction.

18 Claims, 4 Drawing Sheets

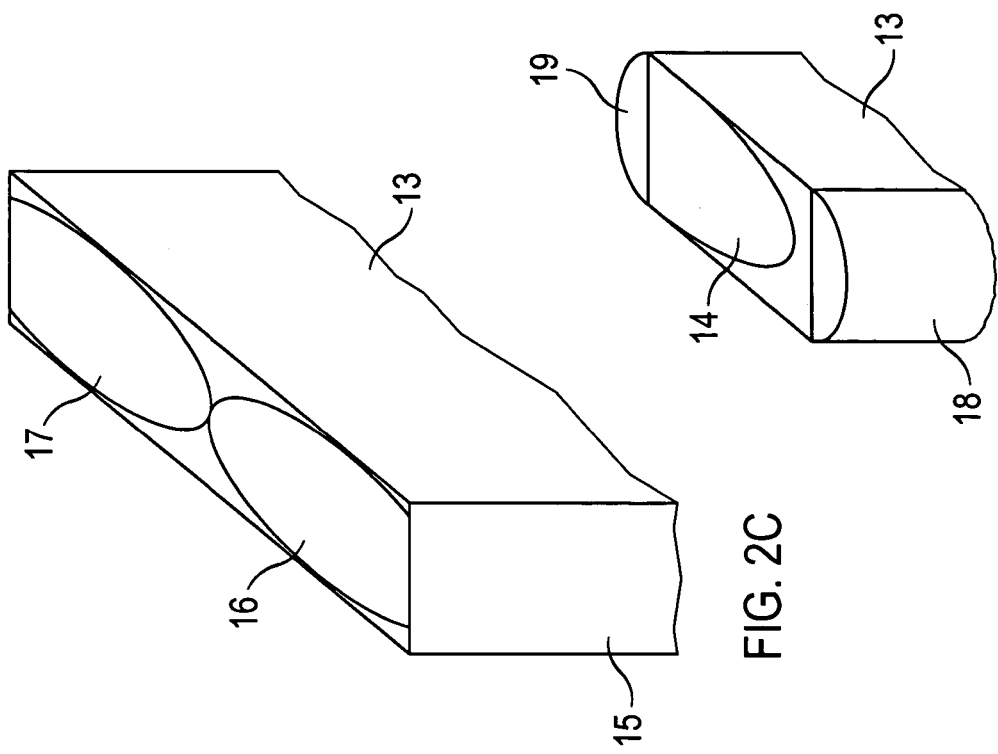
FIG. 2B
FIG. 2C
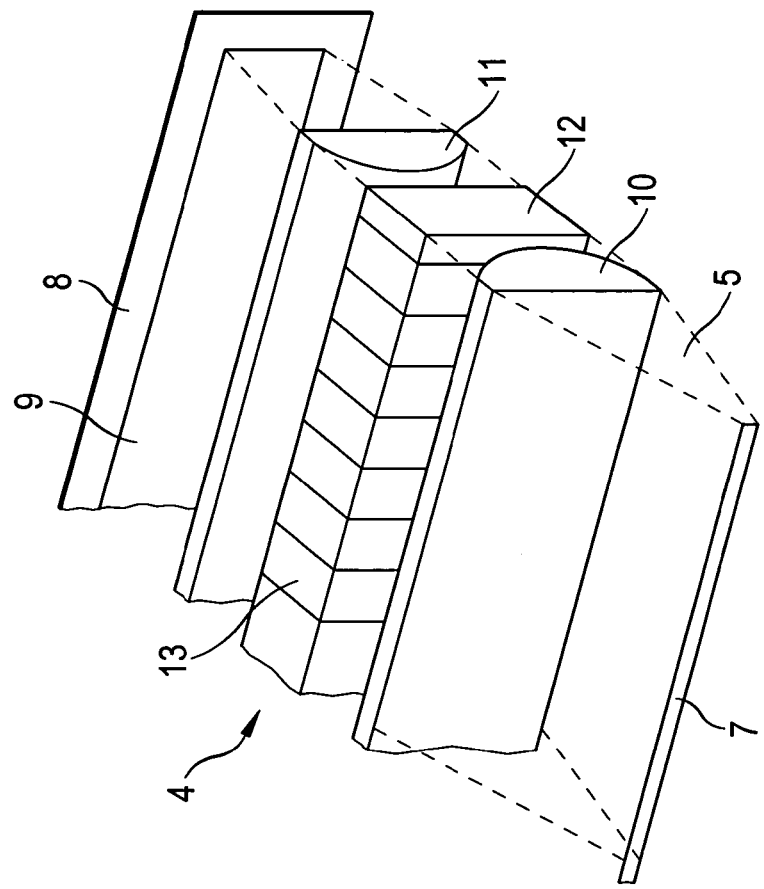
FIG. 2A

IMAGING DEVICE FOR IMAGING A LONG OBJECT

FIELD OF THE INVENTION

The invention relates generally to an imaging device for imaging a long object.

BACKGROUND OF THE INVENTION

When optically scanning an object, for example, a printed text or image, in order to capture information stored therein, the object is generally exposed in a linear manner. The light radiated by the exposed line of the object has an intensity corresponding to the printed text or image. It is imaged by an imaging optical system on a receiver device—generally in linear or matrix form—by which the intensity fluctuations of the light are converted into electrical signals for further processing and display of the scanning result.

Examples of appliances based on this technology are flat-bed scanners and read-out devices for X-ray films. In LED printers, LEDs (light-emitting diodes) arranged in the form of rows or matrices are activated selectively and the light radiated thereby is focused by an imaging optical system on a photosensitive medium from which it is then transferred to paper moving past the photosensitive medium.

In the above-mentioned applications it is the function of the imaging optical system optimally to image a long object, from which light is radiated, on a surface which has substantially the same geometrical dimensions as the object to be imaged.

Such an imaging optical system having a lens array is known, for example, from U.S. Pat. No. 6,088,164. In this imaging optical system light rays from a light source consisting of a plurality of linearly arranged light-emitting elements are focused on a surface of a storage medium by a lens array including a plurality of collecting lenses. The collecting lenses are arranged in the scanning direction such that two lines staggered with respect to one another are produced.

The disadvantage in this prior art is that because of the geometrical boundary conditions for the lens array (maximum constructional size) the numerical aperture is limited, so that the light-collecting power of the imaging optical system is low. This applies all the more if the lens array is constructed as a fibre array. In addition, crosstalk phenomena occur in this case.

A device for reading out information stored in a storage layer is known from DE 199 62 775. In this device the emission radiation radiated by an exposed X-ray cassette is imaged by optical imaging means on receiving means the numerical aperture of which, in relation to the stimulated line of the X-ray cassette, is greater in a direction transverse to the line than in the direction of the line. The imaging means consist of two cylinder lenses disposed parallel to the line stimulated and a lens array arranged between the cylinder lenses and having cylinder lenses perpendicular to the line stimulated.

This construction with cylinder lenses is very complex and therefore expensive because of the many aspherically ground surfaces.

SUMMARY OF THE INVENTION

It is an object of the present invention to provide an imaging optical system which has optimum light-collecting power and is cost-effective to manufacture.

This object is achieved according to the invention by an imaging device comprising: at least one vertical cylinder lens device which concentrates light from a long object in a vertical direction, and a plurality of lens elements arranged in matrix form in at least one lens row behind the vertical cylinder lens device, which in each case concentrate light from the long object in a horizontal direction, wherein each of the plurality of lens elements includes at least one horizontal collecting layer transparent to the light from the long object and having a refractive index which has a gradient in the horizontal direction.

The concept on which the invention is based is to use optical elements with position-dependent refractive index instead of lenses and thereby to replace expensive ground surfaces by a linear "gradient-index (GRIN) array" in manufacture. In particular, the lenses which are used for horizontal concentration of light are replaced according to the invention. Here and in what follows, "horizontal" is understood to mean the direction parallel to the long object and "vertical" is understood to mean the direction perpendicular thereto. Instead of the lens array composed of horizontal cylinder lenses, therefore, a stack of transparent glass layers is used, the glass layers having a changing refractive index (gradient index, GRIN) in the horizontal plane.

In particular, the extension of the at least one transparent horizontal collecting layer in the vertical direction corresponds substantially to the extension of the front and/or rear vertical cylinder lens device in the vertical direction.

In a preferred embodiment the optical thickness of the at least one transparent horizontal collecting layer is selected such that 1:1 imaging is produced thereby.

In addition to their refractive index, at least some of the horizontal collecting layers may include at least one cylindrically curved surface through which the light enters or exits the layer. Through the combination of gradient-index array and curved surface, an increased light-collecting power can be obtained which far surpasses that of curved surfaces as described in the prior art.

The imaging optical system may be used in a device for reading out information stored in a storage layer, comprising a radiation source for stimulating or exposing a linear zone of the storage layer with a primary radiation, so that the storage layer emits a secondary radiation as a function of the information stored therein, and a plurality of photosensitive surfaces arranged in matrix form in at least one receiver row for receiving the secondary radiation from the storage layer, the at least one receiver row being disposed substantially parallel to the linear zone of the storage layer, said imaging optical system being arranged between the radiation source and the at least one receiver row and being transparent to the secondary radiation.

An advantage of the invention is that it is possible to scale or adapt the geometrical dimensions of the optical elements to changing requirements at comparatively low cost over a wide range.

BRIEF DESCRIPTION OF THE DRAWINGS

Further features and advantages of the invention will be apparent from the following description of preferred embodiments and exemplary applications with reference to the appended drawings, in which:

FIGS. 2A, 2B and 2C show a section of a first embodiment of the imaging optical system according to the invention, and the optical features and characteristics of an element thereof;

DETAILED DESCRIPTION OF THE INVENTION

Figure 1:
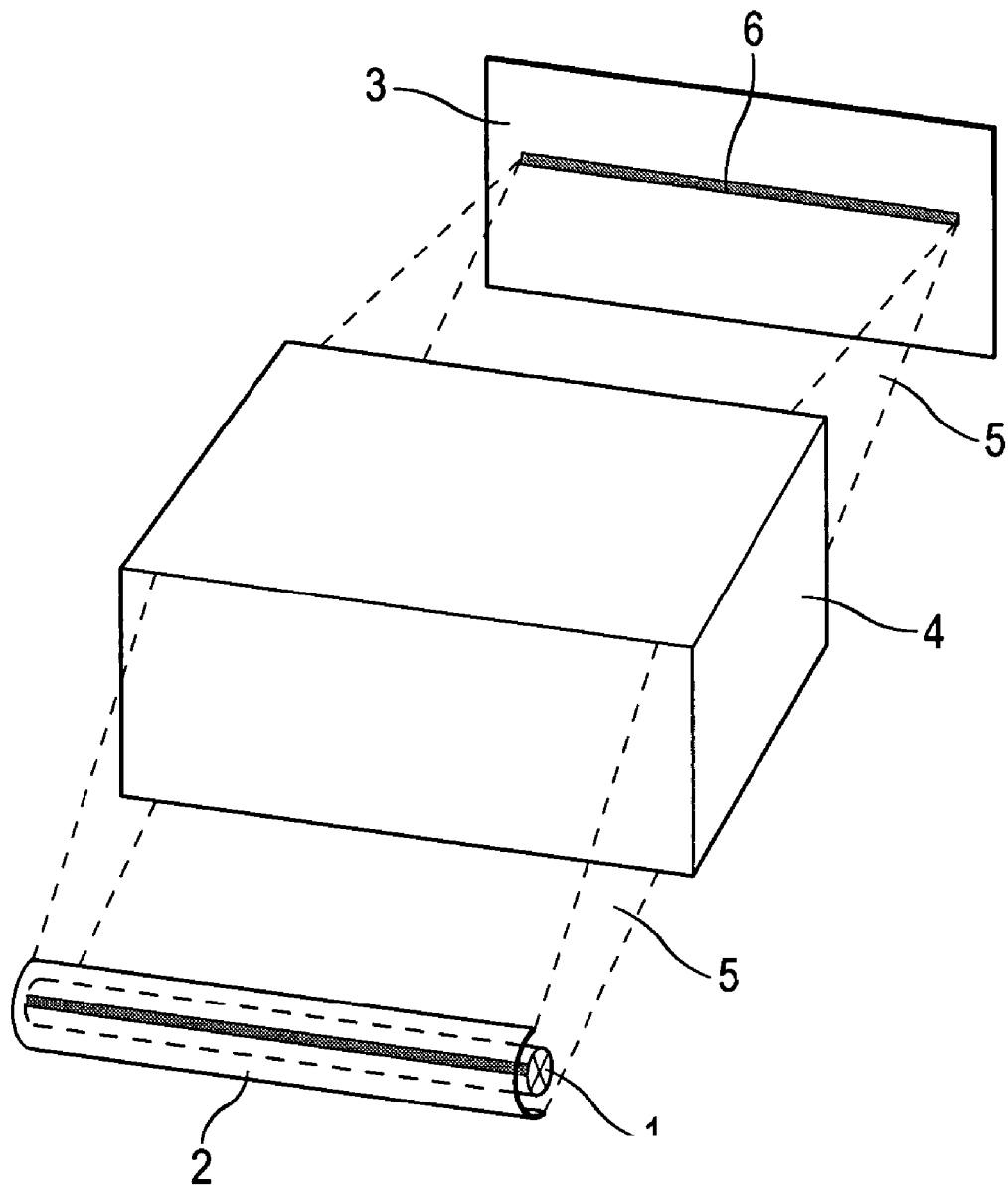
FIG. 1 is a schematic representation of the structure of a conventional printer.

The printer in FIG. 1 includes a light source 1 contained in a housing 2 including a reflector. The light source 1 is composed of a plurality (not shown) of individual elements, e.g., light-emitting diodes (LEDs) which can be activated selectively and independently of one another. Their light is imaged on a photosensitive medium 3 by an imaging optical system 4. The photosensitive medium 3 may be a semiconductor or a photosensitive film which is selectively exposed by means of the printer. Depending on the activation of the individual elements of the light source 1, an image 6 of the light source 1 is produced on the medium 3 by the light 5, both the light source 1 and the image 6 of the light source 1 being represented here for clarity by a broad black line.

A first embodiment of the imaging optical system 4 is represented with individual elements in FIG. 2A. A long object 7 is imaged by the imaging optical system 4. The long object 7 may be a light source, in which case the light 5 is primary light. Equally, however, the long object 7 may be a non-luminous object which is exposed by a primary light source. In this case the light 5 is secondary light which emanates from the long object. An image 9 of the long object 7 is generated by the imaging optical system 4 in an image plane 8. In the embodiment shown, the imaging device includes a front vertical cylinder lens device 10 and a rear vertical cylinder lens device 11, which in each case concentrate the light emanating from the long object 7 in a vertical direction. ("Vertical" means transverse to the longitudinal extension of the object; "horizontal" means in the direction of the longitudinal extension of the object.)

In order to image the long object 7 on the image plane 8 in the horizontal direction also, a plurality of focusing elements are arranged in linear or matrix form between the front and rear vertical cylinder lens devices 10, 11. In the prior art the focusing elements of this matrix or row 12 are cylinder lenses the longitudinal direction of which is disposed vertically with respect to the long object 7, so that the light emanating from the long object 7 is concentrated by the cylinder lenses in a horizontal direction.

However, because such cylinder lenses are expensive to manufacture and because numerous such cylinder lenses are required along the long object 7, in the imaging optical system according to the invention a horizontal collecting layer 13 is in each case used instead of the lens elements, so that a stack 12 of glass layers 13 is produced. Each individual horizontal collecting layer 13 corresponds optically to a cylindrical collecting lens which concentrates the light in a horizontal direction.

For this purpose the individual horizontal collecting layer has a refractive index which is position-dependent and the profile 14 of which is shown in FIG. 2B. As is apparent from the perspective view in FIG. 2B, the profile of the refractive index has a gradient in the horizontal direction, i.e., the refractive index in the centre plane of the horizontal collecting layer 13 which extends in the propagation direction of the light is high, whereas the refractive index at the edges of the horizontal collecting layer 13 is low.

The imaging characteristics of such a horizontal collecting layer 13 are shown in FIG. 2C. Light enters the horizontal collecting layer 13 through a flat entrance face 15 and, depending on its point of entry in the entrance face 15, is deflected at a different angle with respect to the entrance face 15. Depending on their position of entry in the horizontal collecting layer 13 and their angle with respect to the entrance face 15, light rays are refracted at the entrance face 15. The paths of two light rays in the horizontal collecting layer 13 are illustrated, the one to the right of the centre and the other to the left of the centre of the horizontal collecting layer 13. Their ray paths in the horizontal collecting layer 13 in each case produce a branch of an ellipse 16, one branch being disposed clockwise and the other counterclockwise. After their passage through the ellipse 16 an inverted image of the object imaged is thus obtained. To ensure that the image behind the horizontal collecting layer 13 has the same orientation as the object imaged, the optical thickness of the horizontal collecting layer 13 must be selected such that the light passes through two ellipses, or in general through an even number thereof. In FIG. 2C these are the two ellipses 16 and 17.

In a particular embodiment of the horizontal collecting layers 13 represented in FIG. 2B, the entrance faces 18 and the exit faces 19 are cylindrically curved. It is thereby achieved that the positional dependence of the angle of refraction on the distance from the centre plane of the layer can be varied even after the refractive index has been generated (or, conversely, a profile of the entrance and exit faces is produced first and the dependence of the angle of refraction on distance from the centre plane is then varied by generating a refractive-index gradient in the glass). In particular, through the creation of an additional parameter (refractive-index profile and curvature of the entrance and exit faces) the range of the imaging characteristics of the imaging optical system 4 is extended.

1:1 imaging by the horizontal collecting layer 13 is preferably sought; i.e., the image is the same size in the horizontal direction as the object imaged. In principle, however, any desired imaging scale may be selected.

The thickness of the horizontal collecting layer 13, i.e., its extension in the horizontal direction (parallel to the longitudinal extension of the object), is determined by the profile of the refractive-index gradient, or more precisely by the difference between the maximum and minimum refractive indices and by the opening of the parabola. For example, in a particular glass a maximum refractive index of 1.65 and a minimum refractive index of 1.56 can be established by ion exchange when the thickness is between 0.8 mm and 1.3 mm. To minimise the number of components of the device according to the invention, such horizontal collecting layers 13 are preferably used with the maximum possible thickness.

The extension of the horizontal collecting layer 13 in the vertical direction is predetermined substantially by the extension of the front and rear vertical cylinder lens devices 10, 11 in the vertical direction. It is advantageous to select the extension of the horizontal collecting layer 13 in the vertical direction such that the light from the front vertical cylinder lens device 10 completely fills the horizontal collecting layer.

To prevent crosstalk between the individual layers 13, absorber layers (not shown) are preferably inserted between the layers 13. At the same time, these absorber layers perform, in particular, the function of mechanically joining the horizontal collecting layers 13 to one another, i.e., the absorber layers are adhesive layers.

Figure 3:
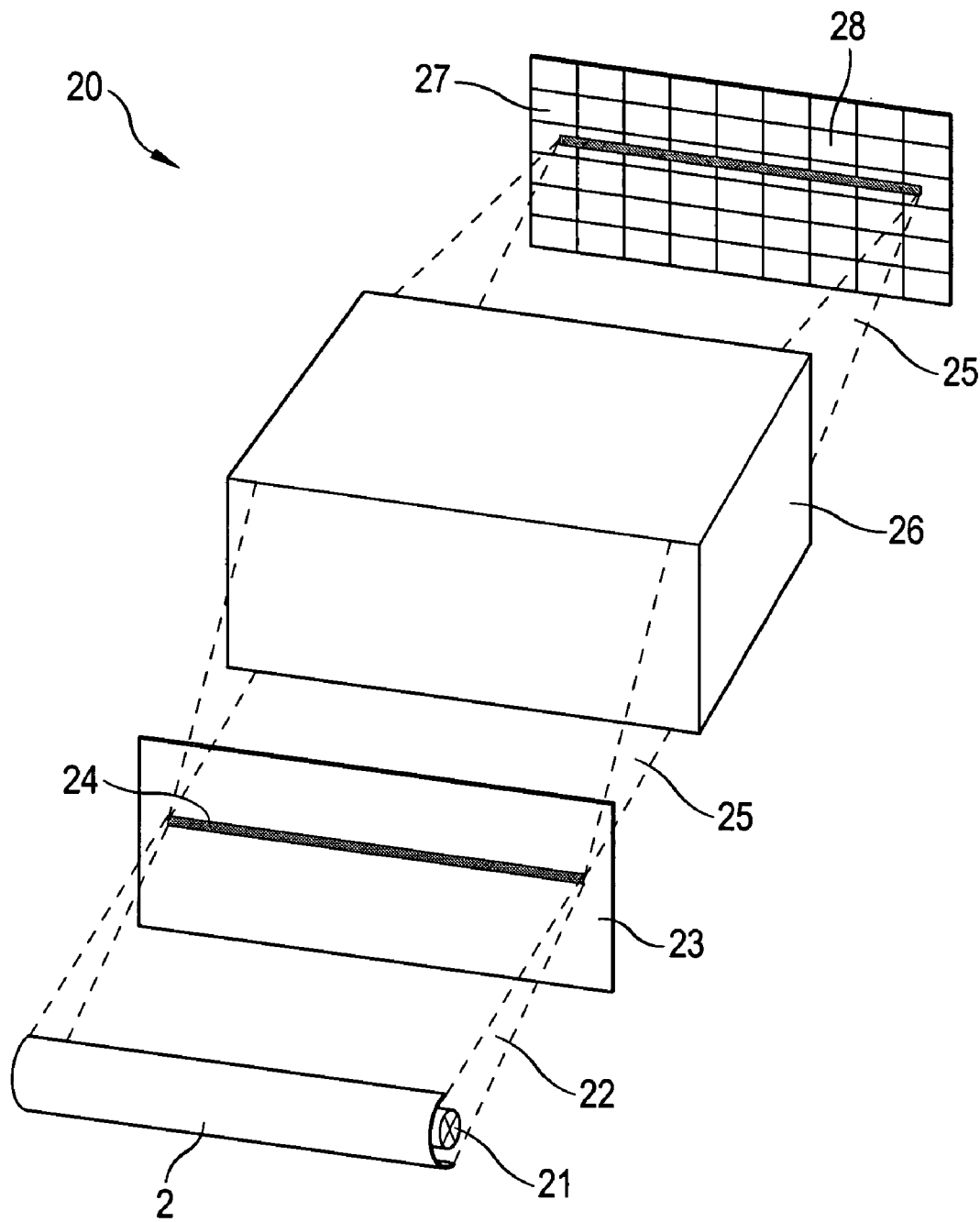
FIG. 3 is a schematic representation of the structure of a transmitted-light scanner in which the invention can be used.

In addition to its suitability for printers, the imaging optical system illustrated in FIGS. 2A to 2C is especially suited to reading out information from storage layers. This is elucidated below with reference to two exemplary applications. FIG. 3 shows a transmitted-light scanner denoted generally by reference numeral 20. The imaging optical system is a component of the transmitted-light scanner 20 for reading out information stored in a storage layer 23. A radiation source 21 serves to stimulate or expose a linear zone 24 of the storage layer 23 with a primary radiation 22. The storage layer 23 is stimulated by the primary radiation 22 (i.e., the primary light 22 is first absorbed by the storage layer), and the storage layer 23 emits a secondary radiation 25 as a function of the information stored therein. This secondary radiation 25 is imaged by means of the imaging optical system 26 on a plurality of photosensitive surfaces 28 arranged in a matrix 27, so that an image of the stimulation line 24 is produced on the matrix 27. For clarity the stimulation line and its image on the matrix 27 are represented as a broad line. This matrix 27 is, in particular, a CCD array which is read out at regular distances, its output signals then being further processed by an electronic system (not shown).

The imaging device 26 is constructed, for example, in the same way as the embodiment in FIGS. 2A to 2C.

Figure 4:
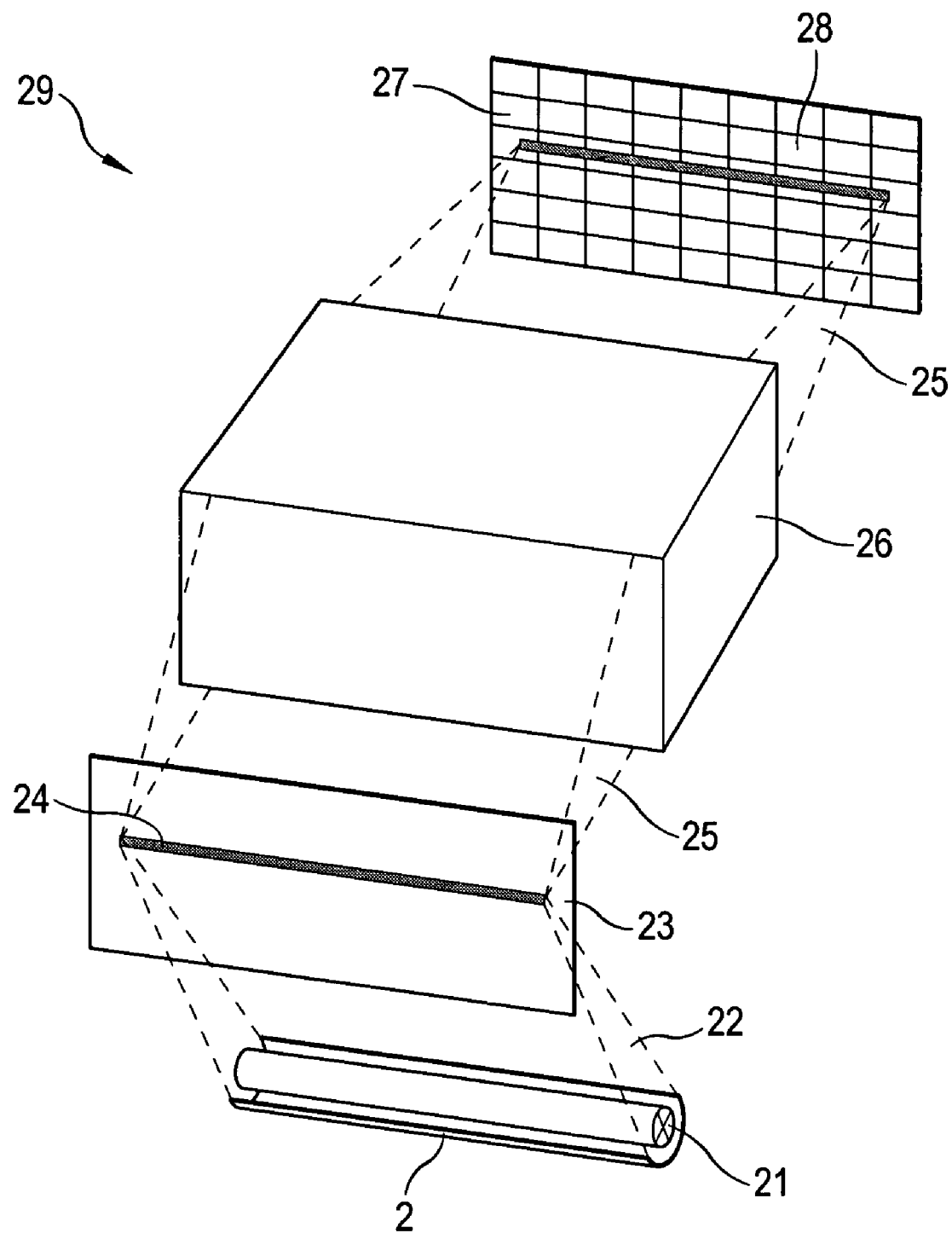
FIG. 4 is a schematic representation of the structure of a reflected-light read-out device in which the invention can be used.

A further exemplary application for the imaging optical system according to the invention is a reflected-light read-out device 29 according to FIG. 4. Such a reflected-light read-out device 29 is used in particular for reading out X-ray cassettes having a storage layer 23. Information is stored in this storage layer 23 by means of X-ray light. After stimulation with a primary light source, secondary light is emitted by the storage layer 23 in the linear stimulated zone 24 and is imaged by means of the imaging optical system 26 on a matrix 27 composed of photosensitive surfaces 28. In such a read-out device for X-ray cassettes, primary light and secondary light may have different wavelengths. It is therefore necessary, on the one hand, that the imaging optical system is transparent to the secondary light and, on the other, primary light can be prevented from reaching the matrix 27 by skilled selection of the transmission range of the imaging optical system 26.

LIST OF REFERENCE NUMERALS

1 Light source
2 Housing, reflector
3 Photosensitive medium
4 Imaging optical system
5 Ray path
6 Image of light source
7 Object
8 Imaging plane
9 Image of object in imaging plane
10 Front cylinder lens for vertical concentration of light
11 Rear cylinder lens for vertical concentration of light
12 Horizontal lens row, stack of transparent horizontal collecting layers
13 Transparent horizontal collecting layer
14 Refractive-index profile in transparent horizontal collecting layer
15 Light entrance face of transparent horizontal collecting layer
16 First inversion of the image in the transparent horizontal collecting layer
17 Second inversion of the image in the transparent horizontal collecting layer
18 Cylindrical entrance face
19 Cylindrical exit face
20 Transmitted-light scanner
21 Light source of transmitted-light scanner
22 Primary radiation
23 Storage layer
24 Exposed (linear) zone of storage layer
25 Secondary radiation
26 Imaging optical system
27 Array (CCD) of photosensitive surfaces
28 Photosensitive surface
29 Reflected-light read-out device for X-ray cassette

The invention claimed is:

1. An imaging device for imaging a long object, comprising
at least one front vertical cylinder lens device which concentrates light from the long object in a vertical direction being transverse to a horizontal direction, which is parallel to a longitudinal axis of the long object, and
a plurality of lens elements arranged in matrix form in at least one lens row behind the vertical cylinder lens device in a propagation direction being an axis of light propagation through the imaging device and being transverse to the horizontal direction and the vertical direction, wherein each of the lens elements concentrates light from the long object in the horizontal direction,
wherein each of the plurality of lens elements includes at least one horizontal collecting layer transparent to the light from the long object and having a refractive index which has a gradient in the horizontal direction and no gradient in the vertical direction; and
wherein an optical thickness in the propagation direction of the at least one transparent horizontal collecting layer for each of the lens elements is selected to generate an image that has the same orientation as the long object after passing through the at least one transparent horizontal collecting layer.

2. A device as claimed in claim 1, wherein an extension of the at least one transparent horizontal collecting layer in the vertical direction corresponds substantially to an extension of the front and/or rear vertical cylinder lens device in the vertical direction.

3. A device as claimed in claim 1, wherein an optical thickness of the at least one transparent horizontal collecting layer is selected so that 1:1 imaging is produced thereby.

4. A device as claimed in claim 1, wherein at least some of the horizontal collecting layers have in each case at least one cylindrically curved surface through which the light enters or exits the layer.

5. A printer device, comprising:
an activatable light source for selectively exposing a photosensitive medium,
at least one front vertical cylinder lens device which concentrates light from the light source in a vertical direction being transverse to a horizontal direction, which is parallel to a longitudinal axis of the light source, and
a plurality of lens elements arranged in matrix form in at least one lens row behind the vertical cylinder lens device in a propagation direction being an axis of light propagation from the light source and being transverse to the horizontal direction and the vertical direction, wherein each of the lens elements concentrates light from the light source in the horizontal direction,
wherein each of the plurality of lens elements includes at least one horizontal collecting layer transparent to the light from the light source and having a refractive index which has a gradient in the horizontal direction and no gradient in the vertical direction; and
wherein an optical thickness in the propagation direction of the at least one transparent horizontal collecting layer for each of the lens elements is selected to generate an image that has the same orientation as the light source after passing through the at least one transparent horizontal collecting layer.

6. A device for reading out information stored in a storage layer, comprising a radiation source for stimulating or exposing a linear zone of the storage layer with a primary radiation, so that the storage layer emits a secondary radiation as a function of the information stored therein;

a plurality of photosensitive surfaces arranged in matrix form in at least one receiver row for receiving the secondary radiation from the storage layer, the at least one receiver row being disposed substantially parallel to the linear zone of the storage layer, an imaging device being transparent to the secondary radiation and being arranged between the radiation source and the at least one receiver row, the imaging device, including:

at least one front vertical cylinder lens device which concentrates light from the linear zone in a vertical direction being transverse to a horizontal direction, which is parallel to a longitudinal axis of the linear zone, and a plurality of lens elements arranged in matrix form in at least one lens row behind the vertical cylinder lens device in a propagation direction being an axis of light propagation through the imaging device and being transverse to the horizontal direction and the vertical direction, wherein each of the lens elements concentrates light from the linear zone in the horizontal direction, wherein each of the plurality of lens elements includes at least one horizontal collecting layer transparent to the light from the linear zone and having a refractive index which has a gradient in the horizontal direction; and wherein an optical thickness in the propagation direction of the at least one transparent horizontal collecting layer for each of the lens elements is selected to generate an image that has the same orientation as the linear zone after passing through the at least one transparent horizontal collecting layer.

7. A transmitted-light scanner having a storage layer for storing information and including a device as claimed in claim 6.

8. A reflected-light read-out device for an X-ray cassette having a storage layer for storing information and including a device as claimed in claim 6.

9. A device as claimed in claim 6, wherein an extension of the at least one transparent horizontal collecting layer in the vertical direction corresponds substantially to an extension of the front and/or rear vertical cylinder lens device in the vertical direction.

10. A device as claimed in claim 6, wherein an optical thickness of the at least one transparent horizontal collecting layer is selected so that 1:1 imaging is produced thereby.

11. A device as claimed in claim 6, wherein at least some of the horizontal collecting layers have in each case at least one cylindrically curved surface through which the light enters or exits the layer.

12. A device as claimed in claim 6, wherein the horizontal collecting layer of each of the plurality of lens elements has no gradient in the vertical direction.

13. A device as claimed in claim 5, wherein an extension of the at least one transparent horizontal collecting layer in the vertical direction corresponds substantially to an extension of the front and/or rear vertical cylinder lens device in the vertical direction.

14. A device as claimed in claim 5, wherein an optical thickness of the at least one transparent horizontal collecting layer is selected so that 1:1 imaging is produced thereby.

15. A device as claimed in claim 5, wherein at least some of the horizontal collecting layers have in each case at least one cylindrically curved surface through which the light enters or exits the layer.

16. A device as claimed in claim 1, wherein absorber layers are included between the horizontal collecting layers of each of the plurality of lens elements to prevent crosstalk between the horizontal collecting layers.

17. A device as claimed in claim 5, wherein absorber layers are included between the horizontal collecting layers of each of the plurality of lens elements to prevent crosstalk between the horizontal collecting layers.

18. A device as claimed in claim 6, wherein absorber layers are included between the horizontal collecting layers of each of the plurality of lens elements to prevent crosstalk between the horizontal collecting layers.

* * * * *